(12) United States Patent
Jiang et al.

(10) Patent No.: US 8,975,526 B2
(45) Date of Patent: Mar. 10, 2015

(54) TOUCH PANEL

(71) Applicant: TPK Touch Solutions (Xiamen) Inc., Xiamen (CN)

(72) Inventors: Yau-Chen Jiang, Hsinchu (TW); Defa Wu, Jinjiang (CN); Jianbin Yan, Putian (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 0 days.

(21) Appl. No.: 14/064,186

(22) Filed: Oct. 27, 2013

(65) Prior Publication Data

US 2014/0116756 A1 May 1, 2014

(30) Foreign Application Priority Data

Oct. 30, 2012 (CN) .......................... 2012 1 0429498

(51) Int. Cl.
*H05K 1/09* (2006.01)
*G06F 3/041* (2006.01)

(52) U.S. Cl.
CPC ............. *G06F 3/041* (2013.01); *Y10S 438/944* (2013.01)
USPC ........... 174/253; 174/254; 438/158; 438/944; 345/173; 345/174; 349/12; 257/57; 200/600

(58) Field of Classification Search
CPC ......... G06F 3/041; G06F 3/044; G06F 3/045; G02F 1/1333; H03K 17/975; H01L 23/522
USPC ........... 174/253, 254; 438/158, 944; 345/173, 345/174; 349/12; 257/57; 200/600
See application file for complete search history.

(56) References Cited

U.S. PATENT DOCUMENTS

| | | | |
|---|---|---|---|
| 2004/0235227 A1* | 11/2004 | Kawase | 438/158 |
| 2011/0115718 A1* | 5/2011 | Hsieh et al. | 345/173 |
| 2011/0134075 A1* | 6/2011 | Takusa | 345/174 |
| 2011/0153263 A1* | 6/2011 | Oda et al. | 702/150 |
| 2011/0192657 A1* | 8/2011 | Chen et al. | 178/18.06 |
| 2011/0234510 A1* | 9/2011 | Jeong et al. | 345/173 |
| 2011/0291977 A1* | 12/2011 | Moriwaki | 345/173 |
| 2011/0304582 A1* | 12/2011 | Ho et al. | 345/174 |
| 2012/0056181 A1* | 3/2012 | Kamata et al. | 257/57 |
| 2012/0098784 A1 | 4/2012 | Kim | |
| 2012/0105344 A1* | 5/2012 | Ko et al. | 345/173 |
| 2012/0175235 A1* | 7/2012 | Jiang et al. | 200/600 |
| 2012/0256877 A1* | 10/2012 | Lin et al. | 345/174 |
| 2013/0050107 A1* | 2/2013 | Xie et al. | 345/173 |
| 2013/0057488 A1* | 3/2013 | Xie et al. | 345/173 |
| 2013/0168221 A1* | 7/2013 | Xie et al. | 200/600 |
| 2013/0271675 A1* | 10/2013 | Misaki | 349/12 |
| 2014/0015766 A1* | 1/2014 | Lin | 345/173 |
| 2014/0028926 A1* | 1/2014 | Jiang et al. | 349/12 |

FOREIGN PATENT DOCUMENTS

| | | |
|---|---|---|
| CN | 102033672 A | 4/2011 |
| EP | 2045698 A2 | 8/2009 |

* cited by examiner

*Primary Examiner* — Xiaoliang Chen
(74) *Attorney, Agent, or Firm* — Gokalp Bayramoglu

(57) ABSTRACT

The present disclosure provides a touch panel, including at least a plurality of first electrode axes, a plurality of second electrode blocks. Each first electrode axis and corresponding second electrode block are disposed at the same level, staggered and electrically isolated from each other. Each first electrode axis is an uninterrupted structure. The touch panel of the present disclosure provides a new electrode pattern, and since all electrodes are disposed at the same level, therefore the electrodes can be formed simultaneously, thereby decreasing the cost of manufacturing process.

16 Claims, 7 Drawing Sheets

TOUCH PANEL

BACKGROUND OF THE DISCLOSURE

This application claims priority of the People's Republic of China Patent Application No. 201210429498.4, filed on Oct. 30, 2012, the entirety of which is incorporated by reference herein.

FIELD OF THE DISCLOSURE

The present disclosure relates to touch input technology, more particularly, to a touch panel.

DESCRIPTION OF THE RELATED ART

Nowadays, personal digital assistants (PDA), mobile phones, notebook computers, tablet PCs, and other portable electronic products typically have embedded touch panels as an interface for data communication. Since these electronic products need to be thinner and lighter, the traditional input devices, such as keyboards or mouse, have to be replaced with other input devices. In addition, the need for tablet PCs has greatly increased as well as the touch panel technology has become one of the key components in the electronic products.

Conventional touch panels mainly comprise X-direction electrodes and Y-direction electrodes in a staggered arrangement. Insulation layers and jumpers are disposed on the intersection of the X-direction electrodes and the Y-direction electrodes, the jumpers electrically connect two adjacent Y-direction electrodes, and the insulation layer is disposed between the X-direction electrodes and the jumpers, such that the X-direction electrodes and the Y-direction electrodes are insulated from each other and conductive in respective directions.

The X-direction electrodes and the Y-direction electrodes intersect and are stacked on each other in conventional touch panel, which explains the need for the insulation layer and the jumpers. Since a lot of processes need to be performed to form the X-direction electrodes, the Y-direction electrodes, the insulation layers and the jumpers, the manufacturing process becomes complicated and the costs high.

SUMMARY OF THE DISCLOSURE

The present disclosure provides a touch panel, wherein the electrode axes and the electrode blocks are staggered and non-cross stacked to each other, so that the insulation layers and the jumper are not needed anymore, thereby simplifying the manufacturing process and reducing the costs.

According to an embodiment, a touch panel comprises a plurality of first electrode axes, wherein each first electrode axis is an uninterrupted structure, and a plurality of second electrode blocks, wherein the plurality of second electrode blocks are arranged in a plurality of rows and spaced from each other, and a plurality of second traces, wherein at least one second electrode block is electrically connected to one second trace. Each first electrode axis and the corresponding second electrode blocks are staggered, disposed at the same level, and electrically isolated from each other.

The touch panel of the present disclosure further comprises a substrate, wherein an active region and a periphery region are defined on the substrate, the periphery region is disposed on one edge of the active region, the first electrode axes and the second electrode blocks are disposed within the active region, and the second traces are disposed within the active region and the periphery region.

According to the touch panel of the present disclosure, wherein the first electrode axis is extended along a first direction, and any two adjacent first electrode axes are parallel with each other, the plurality of rows are defined to a plurality of second electrode axes, each second electrode axis is extended along a second direction, and any two adjacent second electrode axes are parallel with each other, the second electrode blocks in one second electrode axis are electrically connected to one second trace within the periphery region.

According to the touch panel of the present disclosure, wherein parts of the second traces cross each other within the periphery region, and the touch panel further comprises a plurality of insulators disposed on the intersected portions of the second traces.

According to the touch panel of the present disclosure that comprises a plurality of first traces disposed within the periphery region, each first trace is connected to one first electrode axis.

According to the touch panel of the present disclosure, wherein parts of the first traces intersect with parts of the second traces within the periphery region, the touch panel further comprises a plurality of insulators disposed on the intersected portions of the first traces and the second traces.

According to the touch panel of the present disclosure, wherein each second trace disposed within the active region comprises a plurality of transparent traces and a plurality of low-resistance traces with lower resistance connected with the transparent traces.

According to the touch panel of the present disclosure, the material of the low-resistance traces comprises metal and nano-silver.

According to the touch panel of the present disclosure, the length of each low-resistance trace is smaller than 0.25 millimeter (mm), and each width of the low-resistance trace is smaller than 0.008 millimeter.

According to the touch panel of the present disclosure, each first electrode axis is "S" shaped, and the second electrode blocks are alternately arranged at both sides of the corresponding first electrode axes.

According to the touch panel of the present disclosure, each first electrode axis comprises a first vertical part formed along a first direction and a first horizontal part formed along a second direction, wherein the first horizontal part is formed from the first vertical part along a second direction.

According to the touch panel of the present disclosure, each second electrode block comprises a second vertical part formed along a first direction and a second horizontal part formed along a second direction, wherein the second horizontal part is formed from the second vertical part along a second direction, the first vertical part is parallel to the second vertical part, the first horizontal part and the second horizontal part are staggered with an inter-digital pattern and electrically isolated from each other.

According to the touch panel of the present disclosure, the first direction is perpendicular to the second direction.

According to the touch panel of the present disclosure, the arrangement between the plurality of transparent traces and the plurality of low-resistance traces is a type of staggered arrangement.

According to the touch panel of the present disclosure, each first electrode axis with "S" shaped has at least two recesses, and the second electrode blocks are alternately arranged in the recesses.

According to the touch panel of the present disclosure, one row of the second electrode, blocks is electrically connected to one second trace.

According to the touch panel of the present disclosure, one first electrode axis and the second electrode blocks staggered with the first electrode axis are defined to be a assembly, and the second traces connected to the second electrode blocks staggered with the first electrode axis are disposed in at least one side of the assembly.

According to the touch panel of the present disclosure, the second electrode blocks staggered with one first electrode axis are arrange along a direction which is parallel with the extending direction of the first electrode axis.

In the touch panel of the present disclosure, the first electrode axes and the corresponding second electrode blocks are disposed at a same level, staggered and not stacked on each other. Unlike the conventional touch panels, the present disclosure does not need insulation layers and jumpers to be formed, thereby simplifying the manufacturing process and reducing the costs.

These and other objectives of the present invention will no doubt become obvious to those of ordinary skill in the art after reading the following detailed description of the preferred embodiment that is illustrated in the various figures and drawings.

DETAILED DESCRIPTION OF THE EMBODIMENTS

To provide a better understanding of the present disclosure to users skilled in the art, preferred embodiments are detailed as follows. The preferred embodiments of the present disclosure are illustrated in the accompanying drawings with numbered, elements to clarify the contents and effects to be achieved.

Those of ordinary skill in the art will recognize that the figures are only for illustration and the figures may not be to scale. The scale may be further modified according to different design considerations. On referring to the words "up" or "down" that describe the relationship between components in the text, it is well known to a person skilled in the art, that these words refer to relative positions that can be inverted to obtain a similar structure, and these structures should therefore not be precluded from the scope of the claims in the present disclosure.

Figure 1:
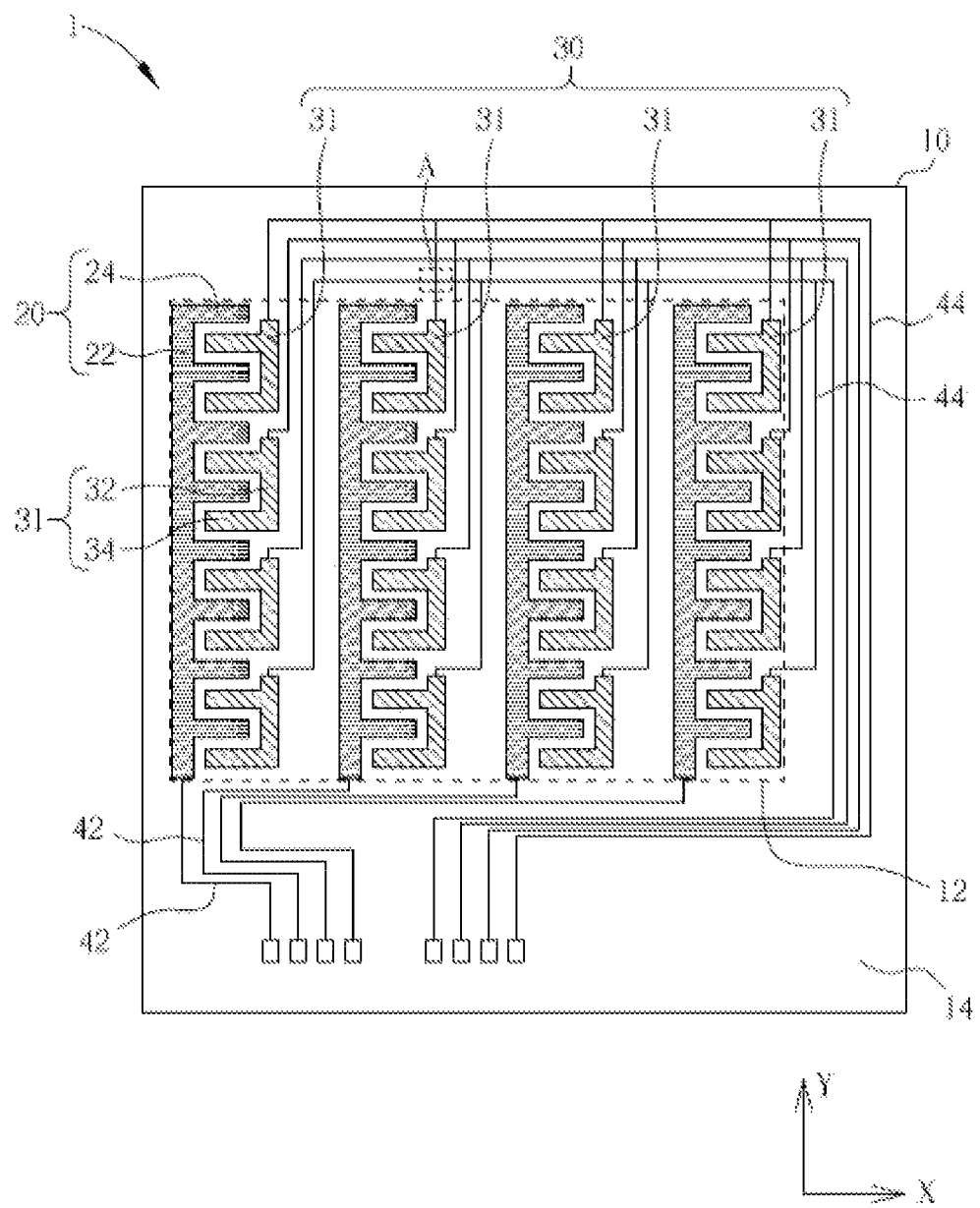
FIG. 1 is a schematic, top-view diagram showing a touch panel according to the first preferred embodiment of the present disclosure.

FIG. 1 is a top-view diagram of a touch panel according to the first preferred embodiment of the present disclosure. As shown in FIG. 1, the touch panel 1 comprises a plurality of first electrode axes 20 and a plurality of second electrode blocks 31. Each first electrode axis 20 and each second electrode block 31 are disposed at the same level (or plane) and staggered with each other (specifically, the second electrode blocks 31 are "embedded" in the recesses of the first electrode axes 20), but they do not cross each other and are electrically isolated from each other.

In this embodiment, each first electrode axis 20 comprises at least one first vertical part 22 formed along a first direction (i.e. Y-axis), a plurality of first horizontal parts 24 formed along a second direction (i.e. X-axis), wherein each first horizontal part 24 is extending from the first vertical part 22 along the second direction. Each second electrode block 31 includes at least one second vertical part 32 formed along the first direction and a plurality of second horizontal parts 34 formed along the second direction, wherein each second horizontal part 34 is extending from the second vertical part 32 along the second direction. For example, as shown in FIG. 1, two or more second horizontal parts 34 could be extending from the second vertical part 34, but it is not limited thereto. Each first vertical part 22 is parallel to each corresponding second vertical part 32, and each first horizontal part 24 is parallel to each corresponding second horizontal part 34. In this embodiment, each first horizontal part 24 and each corresponding second horizontal part 34 are arranged in an interdigital pattern, but do not contact each other. In other words, the first electrode axes 20 and the second electrode blocks 31 are electrically isolated from each other. Besides, the first direction and the second direction preferably cross each other with a right angle, but not limited thereto.

Each first electrode axis 20 is extended along the first direction, and any two adjacent first electrode axes 20 are parallel with each other. The second electrode blocks 31 are arranged in a plurality of rows and spaced from each other along the second direction, wherein the second electrode blocks 31 disposed in a same row are defined as a second electrode axis 30. Each second electrode axis 30 is extended along the second direction, and any two adjacent second electrode axes 30 are parallel with each other. The second electrode blocks 31 staggered with one first electrode axis 20 are arrange along a direction which is parallel with the extending direction of the first electrode axis. It is worth noting that each first electrode axis 20 is an uninterrupted structure. In other words, there is no gap or space disposed on the first electrode axis 20; on the contrary, the second electrode axis 30 is an interrupted structure comprising a plurality of second electrode blocks 31.

Besides, the touch panel 1 further includes a substrate 10, an active region 12 and a periphery region 14 respectively defined on the substrate 10, wherein the periphery region 14 is disposed on at least one side of the active region 12, the first electrode axes 20 and the second electrode blocks 31 are disposed within the active region 12. The touch panel 1 further comprises a plurality of first traces 42 and a plurality of second traces 44, wherein at least one second electrode block 31 is electrically connected to a second trace 44, each first electrode axis 20 is electrically connected to a first trace 42, each first trace 42 and each second trace 44 is electrically connected to a controller (not shown) disposed outside of the substrate 10 to transfer the electrical signal to the controller. The first trace 42 is disposed within the periphery region 14, the second trace 44 is disposed within the active region 12 and the periphery region 14. Furthermore, one first electrode axis 20 and the second electrode blocks 31 staggered with the first electrode axis 20 are defined to be a assembly, and the second traces 44 connected to the second electrode blocks 31 staggered with the first electrode axis 20 are disposed in one side of the assembly.

It is worth noting that there are a lot of traces disposed within the periphery region 14. In order to reduce the space occupied by the traces, as shown in FIG. 1, the second traces 44 connected with the second electrode blocks 31 of a same second electrode axis 30 are combined into one trace within the periphery region 14, and the trace is electrically connected to a port (not shown) of the controller. In other words, the second electrode blocks 31 in one second electrode axis 30 are electrically connected to one second trace 44 within the periphery region. The first electrode axes 20 can be driving lines for receiving driving signals and the second electrode axes 30 can be sensing lines for transferring sensing signals to the controller, but it is not limited thereto. When the touch panel 1 is touched, the electrical signal generated by the second electrode axis 30 is transferred to the port of the controller through each second trace 44 in order to confirm the coordinate location of the first direction (such as Y-axis). In addition, the electrical signal generated by the first electrode axis 20 is transferred to another port of the controller through each first trace 42 in order to confirm the coordinate location of the second direction (such as X-axis) so the coordinate location can be decided, i.e. the touched place can be determined. In this embodiment, the second traces 44 connected with the second electrode blocks 31 of a same second electrode axis 30 are combined into one trace within the periphery region 14, thereby significantly reducing the amount of traces, and further decreasing the space occupied by the traces. The conventional insulation layers and the jumpers do not need to be formed in the present invention, thereby avoiding the issue coming from the jumpers made of metal that influences the visibility of the active region.

In another embodiment of the present disclosure, each second trace 44 can be electrically connected to different ports, so that when the touch panel 1 is touched, the electrical signal generated by the second electrode blocks 31 is transferred to different controller's ports through each second trace 44. Since the second electrode blocks 31 are isolated from each other, therefore each second electrode block 31 corresponds to a coordinated location. Besides, in the present disclosure, the touch panel 1 may include parts of second traces 44 that are combined into one trace, and parts of second traces 44 which are not combined and are isolated from each other. The structure should be comprised in the scope of the present invention.

Figure 2:
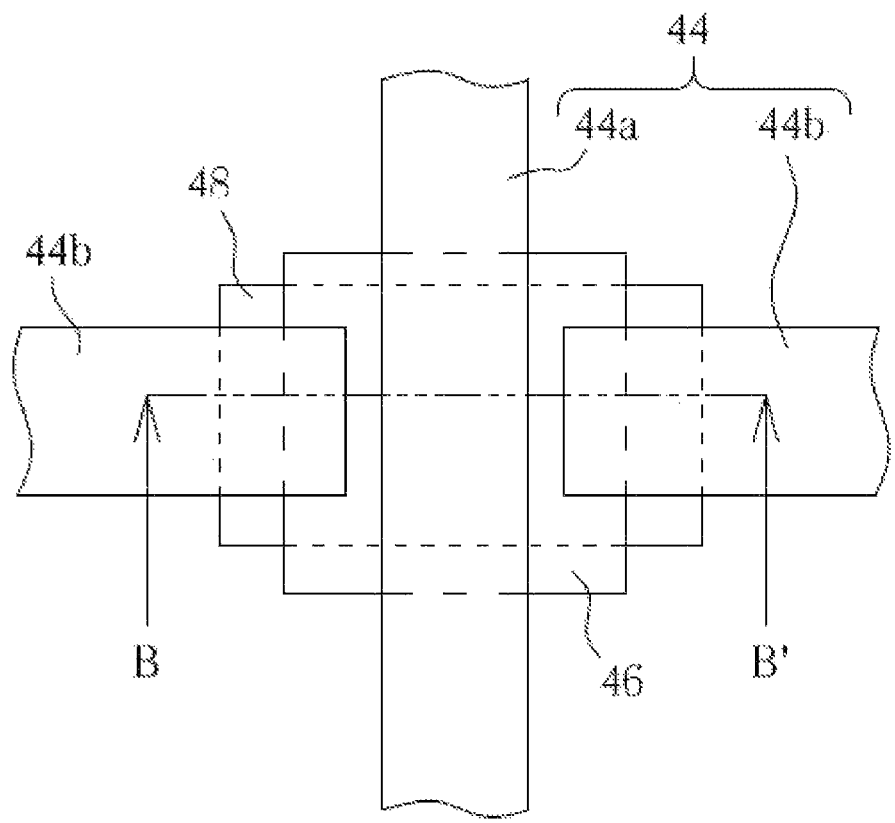
FIG. 2 is a partial enlarged view diagram showing the region A of FIG. 1.
Figure 3A:
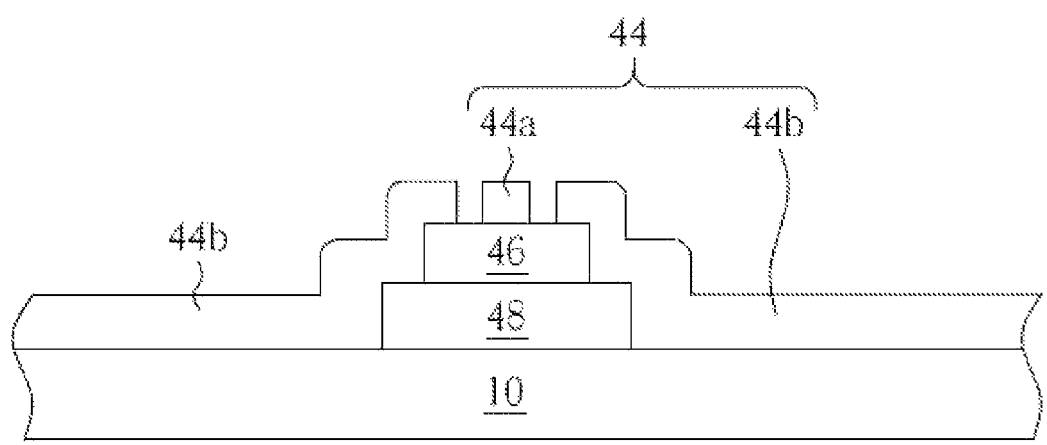
FIG. 3A is a cross-sectional view diagram according to the section line B-B' in FIG. 2.
Figure 3B:
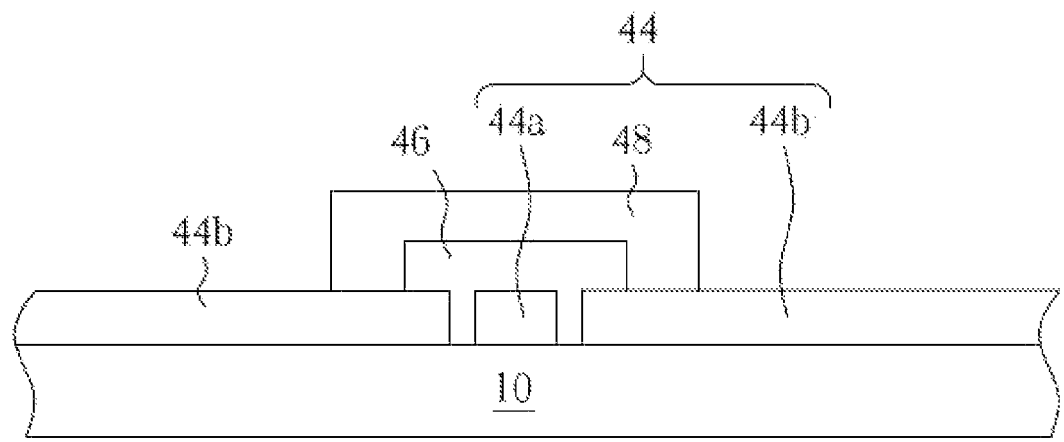
FIG. 3B is a cross-sectional view diagram according to the section line B-B' in FIG. 2 in another embodiment.

When a lot of traces are disposed within the periphery region 14, especially such as the second trace 44 are combined into one trace within the periphery region 14 aforesaid, some traces may cross each other. For example, some first traces 42 may intersect with some second traces 44, or some second traces 44 may intersect with each other in the periphery region 14. In order to avoid interferences on the intersection of the traces, a plurality of insulators may be formed between the first traces 42 and the second traces 44 or between the second traces 44. FIG. 2 is a partial enlarged view diagram showing the region A of FIG. 1, FIG. 3A and FIG. 3B show the cross-sectional view diagrams of two different embodiments according to the section line B-B' in FIG. 2. As shown in FIG. 2, FIG. 3A and FIG. 3B, the second traces 44 include some second traces 44a disposed along the first direction (such as Y-axis) and some second traces 44b disposed along the second direction (such as X-axis), each second trace 44a is an uninterrupted structure, each second trace 44b is an interrupted structure connected through jumpers 48. The second traces 44a and the second traces 44b cross each other, and the FIG. 3A and FIG. 3B respectively show two different interleaved modes of the second traces 44a and the second traces 44b. A plurality of insulators 46 are disposed between the jumpers 48 and the second traces 44a to electrically isolate the second trace 44a and the second trace 44b on the intersection. In another embodiment of the present invention (not shown), each second trace 44a along the first direction is an uninterrupted structure and each second trace 44b along the second direction is an uninterrupted structure too. The insulators 46 are disposed directly between the second trace 44a and the second trace 44b. In this embodiment, the second traces 44 cross each other, but the present invention is not limited thereto, the second traces 44 can be isolated from each other, or parts of second traces 44 cross each other, but parts of second traces 44 are isolated from each other. If all of the second traces 44 are isolated from each other, the process to form the insulators 46 and the jumpers 48 can be skipped, thereby simplifying the manufacturing process.

The following description will detail the different embodiments of the touch panel of the present disclosure. To simplify the description, the following description will detail the dissimilarities among the different embodiments and the identical features will not be redundantly described. In order to compare the differences between the embodiments easily, the identical components in each of the following embodiments are marked with identical symbols.

Figure 4:
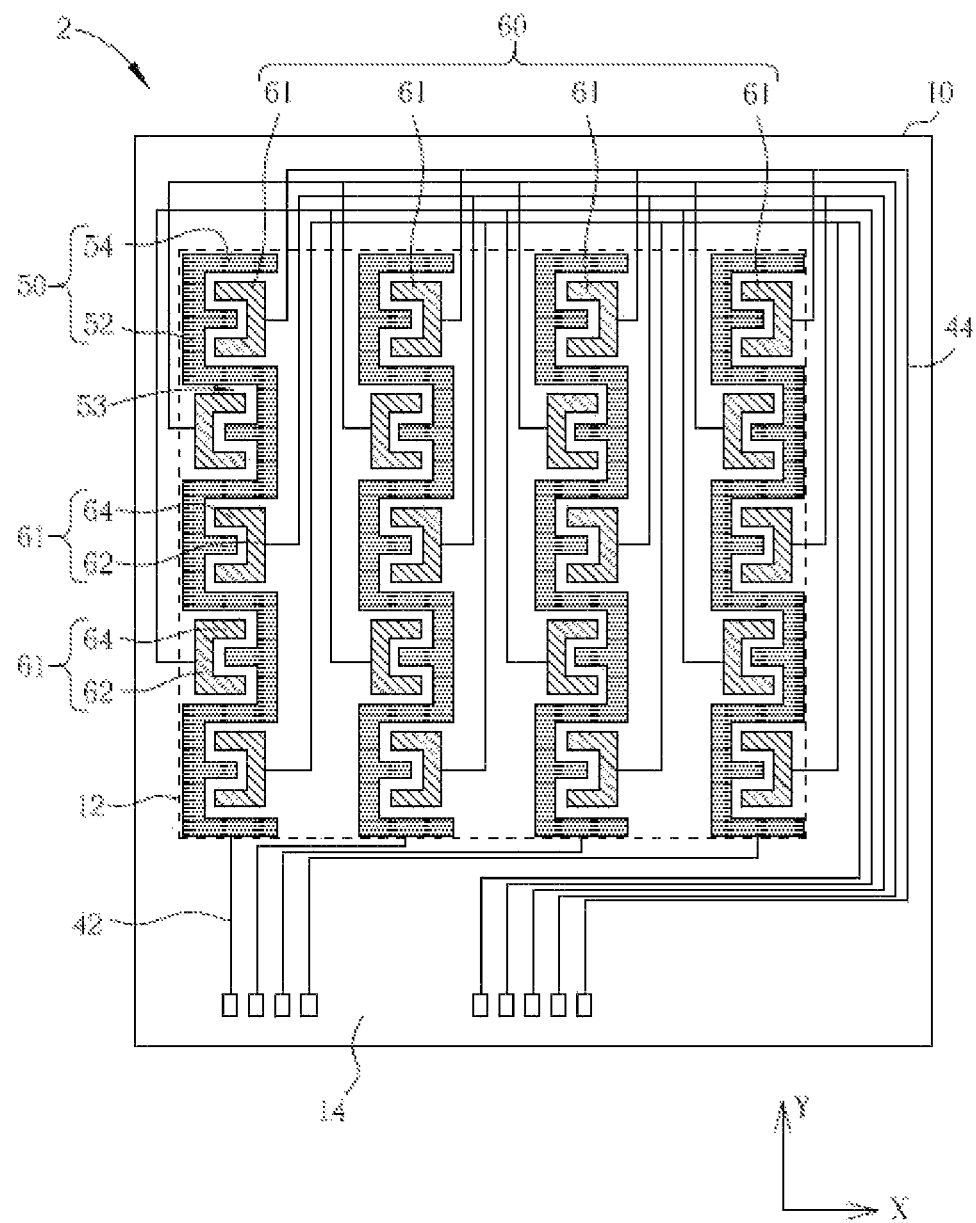
FIG. 4 is a schematic, top-view diagram showing a touch panel according to the second preferred embodiment of the present disclosure.

FIG. 4 is a schematic, top-view diagram showing a touch panel according to the second preferred embodiment of the present disclosure. Similar to the first preferred embodiment, a touch panel 2 includes at least a plurality of first electrode axes 50 and a plurality of second electrode blocks 61. Each first electrode axis 50 is extended along the first direction, and any two adjacent first electrode axes 50 are parallel with each other. The second electrode blocks 61 are arranged along the second direction, wherein the second electrode blocks 61 disposed in a same row are defined as a second electrode axis 60, and two adjacent second electrode axes 60 are parallel with each other. Each first electrode axis 50 is an uninterrupted structure, the first electrode axes 50 and the corresponding second electrode blocks 61 are disposed at the same level (or plane) and staggered with each other (specifically, the second electrode blocks 61 are "embedded" in the recess of the first electrode axes 50), and do not cross each other and are electrically isolated from each other. The difference between this embodiment and the first preferred embodiment is that the shape of the electrode and the disposition are different. In this embodiment, each first electrode axis 50 comprises at least one first vertical part 52 formed along a first direction (i.e. Y-axis), a plurality of first horizontal part 54 formed along a second direction (i.e. X-axis), wherein each first electrode axis 50 is substantially "S" shaped having at least two recesses 53, the second electrode blocks 61 are alternately arranged in the recesses 53. Each second electrode block 61 includes at least one second vertical part 62 formed along a first direction (i.e. Y-axis), a plurality of second horizontal part 64 formed along a second direction (i.e. X-axis), the second electrode blocks 61 are alternately arranged at both sides of the corresponding first electrode axis 50. Furthermore, one first electrode axis 50 and the second electrode blocks 61 staggered with the first electrode axis 50 are defined to be a assembly, and the second traces 44 connected to the second electrode blocks 61 staggered with the first electrode axis 50 are disposed in two sides of the assembly. The other components, material properties, and manufacturing method of the touch panel 2 are similar to those of the first preferred embodiment detailed above and will not be redundantly described. This embodiment provides a touch panel with another electrode pattern, it can reach the same performances as those of the first preferred embodiment. In this embodiment, similar to the first preferred embodiment, the traces 42 and the traces 44 can also be selectively combined into one trace according to the actual requirement; it is also described above and will not be redundantly described here.

Figure 5:
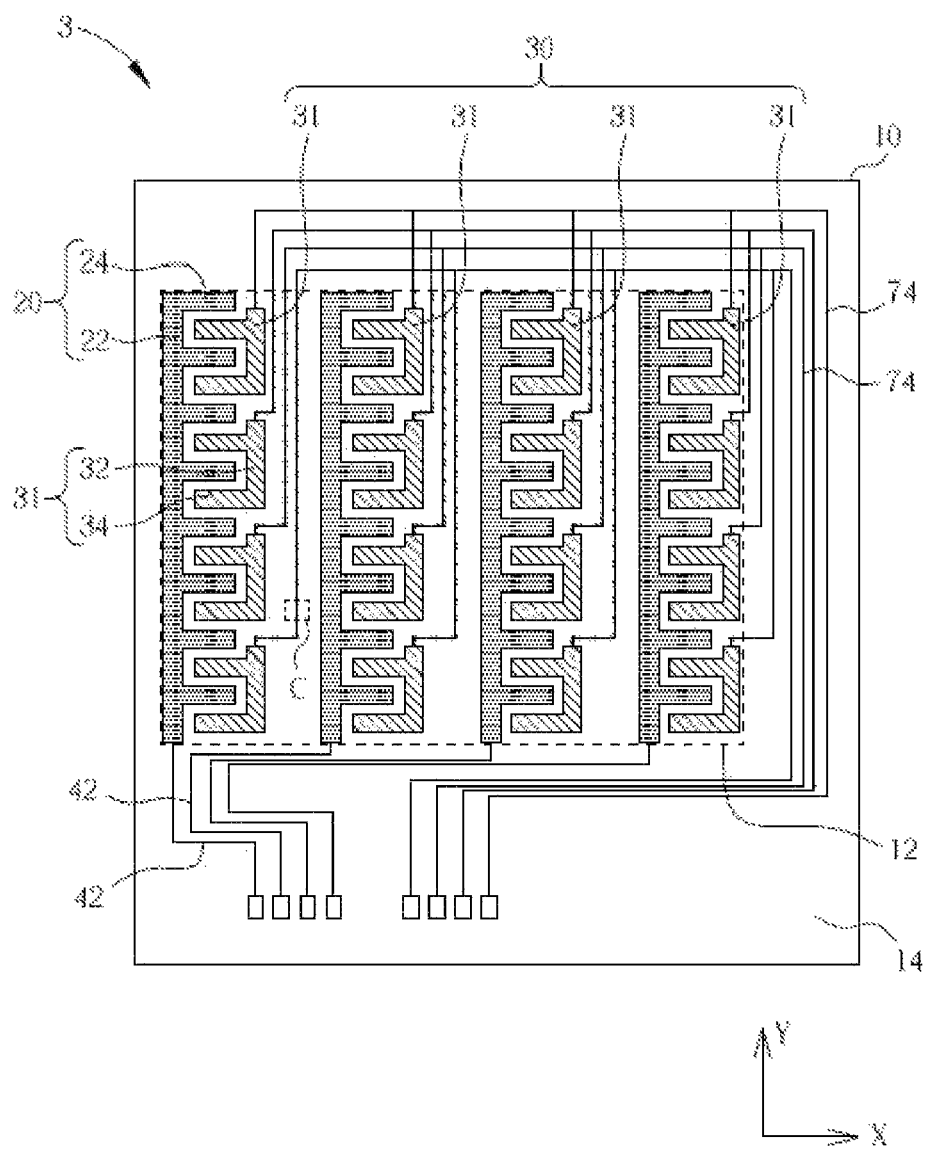
FIG. 5 is a schematic, top-view diagram showing a touch panel according, to the third preferred embodiment of the present disclosure.
Figure 6:
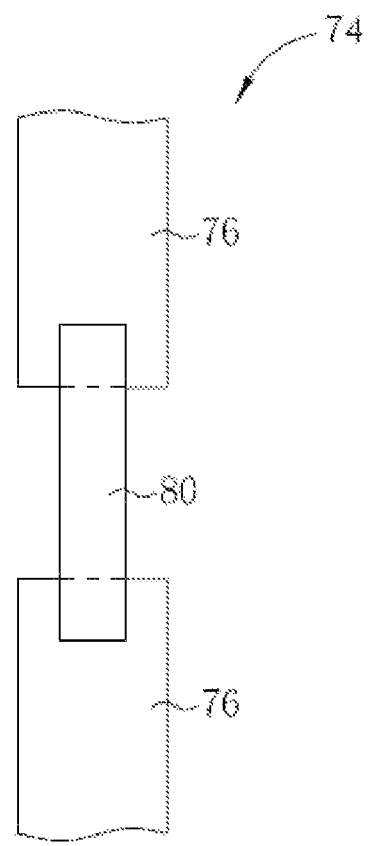
FIG. 6 is a partial enlarged view diagram showing the region C of FIG. 5.

FIG. 5 is a schematic, top-view diagram showing a touch panel according to the third preferred embodiment of the present disclosure. FIG. 6 is a partial enlarged view diagram showing the region C of FIG. 5. The difference between this embodiment and the first preferred embodiment is that each second trace 74 disposed within the active region 12 comprises a plurality of transparent traces 76 and a plurality of low-resistance traces 80 with lower resistance connected with the transparent traces 76. In other words, each second trace 74 disposed within the active region 12 is divided into many segments (such as transparent traces 76) which are connected by a plurality of low-resistance traces 80 with lower resistance. The arrangement between the plurality of transparent traces 76 and the plurality of low-resistance traces 80 is a type of staggered arrangement. In this embodiment, the material of the low-resistance traces 80 comprises metal, nano-silver or others low resistance materials, wherein the resistance of the low-resistance traces 80 is lower than the second trace 74, the length of one low-resistance trace 80 is preferably smaller than 0.25 millimeter (mm), and the width of one low-resistance trace is preferably smaller than 0.008 millimeter. Due to the small area of the low-resistance trace 80, the visibility of the active region 12 of the touch panel 3 will not be influenced, and because the low-resistance trace 80 is of high conductivity, the whole resistance of the second trace 74 will be reduced significantly thereby improving the performances of the touch panel 3. Besides, the material of the first traces 42 and the second traces 74 disposed within the periphery region 14 is preferably chosen to be similar to that of the low-resistance trace 80, such as metals to further improve the performance, but not limited thereto. Transparent conductive material can be chosen to form the second traces 74. Besides, as shown in FIG. 6, the low-resistance traces 80 are disposed on the second traces 74, but not limited thereto; the low-resistance traces 80 can be formed before the second traces 74 are formed, therefore, the low-resistance traces 80 will be disposed under the second trace 74. The other components, material properties, and manufacturing method of the touch panel 3 are similar to those of the first preferred embodiment detailed above and will not be redundantly described.

In those embodiments mentioned above, the material of the first electrode axes and the second electrode blocks include a transparent conductive material such as indium tin oxide (ITO), indium zinc oxide (WO), cadmium tin oxide (CTO), aluminum zinc oxide (AZO), indium tin zinc oxide (ITZO), tin oxide (TiO), zinc oxide (ZnO), cadmium oxide (CaO), hafnium oxide (HfO), indium gallium zinc oxide (InGaZnO), indium gallium zinc magnesium oxide (InGaZnMgO), indium gallium magnesium oxide (InGaMgO) or indium gallium aluminum oxide (InGaAlO) etc, further including nanoparticle materials such as carbon nano tube (CNT), silver carbon nano tube or copper carbon nano tube etc, but not limited thereto.

In addition, the touch panel of the present disclosure may further include a protection layer (not shown) that completely covers the first electrode axes, the second electrode blocks, the first traces and the second traces to protect the components disposed under the protection layer from humidity and oxidation. Besides, the features of the first embodiment to the third embodiment can be combined to each other. For example, the "S" shaped electrode pattern shown in the second embodiment can be combined with the low-resistance traces shown in the third embodiment, and therefore should be comprised in the scope of the present invention. It can be understood that in each embodiment mentioned above, one first electrode axis corresponds to a plurality of second electrode blocks arranged in an inter-digital shape, but the present invention is not limited thereto, others shapes can be applied, such as arc-shaped, the arranged shaped and the disposition can be adjusted according to the actual requirements.

To summarize, the present disclosure provides a touch panel with a new electrode pattern, each first electrode axis is an uninterrupted structure, each first electrode axis and the corresponding second electrode blocks are staggered and not stacked on each other, unlike in the conventional touch panel, so the insulation layers and the jumpers do not need to be formed in the present invention, thereby simplifying the manufacturing process and reducing the costs.

While certain embodiments have been shown and described, various modifications and substitutions may be made thereto without departing from the spirit and scope of the disclosure. Therefore, it is to be understood that the present disclosure has been described by way of illustration and not limitations.

What is claimed is:

1. A touch panel, comprising: a plurality of first electrode axes, wherein each first electrode axis is an uninterrupted structure; a plurality of second electrode blocks, wherein the plurality of second electrode blocks are arranged in a plurality of rows and spaced from each other, wherein each first electrode axis and the corresponding second electrode blocks are disposed at a same level, staggered and electrically isolated from each other; and a plurality of second traces, wherein at least one second electrode block is electrically connected to one second trace; a substrate, wherein an active region and a periphery region are defined on the substrate, the periphery region is disposed on at least one edge of the active region, the first electrode axes and the second electrode blocks are disposed within the active region, and the second traces are disposed within the active region and the periphery region; and wherein each second trace disposed within the active region comprises a plurality of transparent traces and a plurality of low-resistance traces with lower resistance connected with the transparent traces.

2. The touch panel of claim 1, wherein the first electrode axis is extended along a first direction, and any two adjacent first electrode axes are parallel with each other, the plurality of rows are defined to a plurality of second electrode axes, each second electrode axis is extended along a second direction, and any two adjacent second electrode axes are parallel with each other, the second electrode blocks in one second electrode axis are electrically connected to one second trace within the periphery region.

3. The touch panel of claim 1, wherein parts of the second traces cross each other within the periphery region, and the touch panel further comprises a plurality of insulators disposed on the intersected portions of the second traces.

4. The touch panel of claim 1, further comprising a plurality of first traces disposed within the periphery region, wherein each first trace is connected to one first electrode axis.

5. The touch panel of claim 4, wherein parts of the first traces intersect parts of the second traces within the periphery region, and the touch panel further comprises a plurality of insulators disposed on the intersected portions of the first traces and the second traces.

6. The touch panel of claim 1, wherein the material of the low-resistance traces comprises metal and nano-silver.

7. The touch panel of claim 6, wherein the length of each low-resistance trace is smaller than 0.25 millimeter (mm), and the width of each low-resistance trace is smaller than 0.008 millimeter (mm).

8. The touch panel of claim 1, wherein each first electrode axis is "S" shaped, and the second electrode blocks are alternately arranged at both sides of the corresponding first electrode axis.

9. The touch panel of claim 1, wherein each first electrode axis comprises a first vertical part formed along a first direction and a first horizontal part formed along a second direction, and wherein the first horizontal part is formed from the first vertical part along a second direction.

10. The touch panel of claim 9, wherein each second electrode block comprises a second vertical part formed along a first direction and a second horizontal part formed along a second direction, wherein the second horizontal part is formed from the second vertical part along a second direction, the first vertical part is parallel to the second vertical part, the first horizontal part and the second horizontal part are staggered with an inter-digital pattern and electrically isolated from each other.

11. The touch panel of claim 9, wherein the first direction is perpendicular to the second direction.

12. The touch panel of claim 1, wherein the arrangement between the plurality of transparent traces and the plurality of low-resistance traces is a type of staggered arrangement.

13. The touch panel of claim 8, wherein each first electrode axis with "S" shaped has at least two recesses, and the second electrode blocks are alternately arranged in the recesses.

14. The touch panel of claim 1, wherein one row of the second electrode blocks is electrically connected to one second trace.

15. The touch panel of claim 14, wherein one first electrode axis and the second electrode blocks staggered with the first electrode axis are defined to be an assembly, and the second traces connected to the second electrode blocks staggered with the first electrode axis are disposed in at least one side of the assembly.

16. The touch panel of claim 1, wherein the second electrode blocks staggered with one first electrode axis are arrange along a direction which is parallel with the extending direction of the first electrode axis.

* * * * *